(No Model.)
T. C. MYERS.
STREET SWEEPER.
No. 501,353. Patented July 11, 1893.
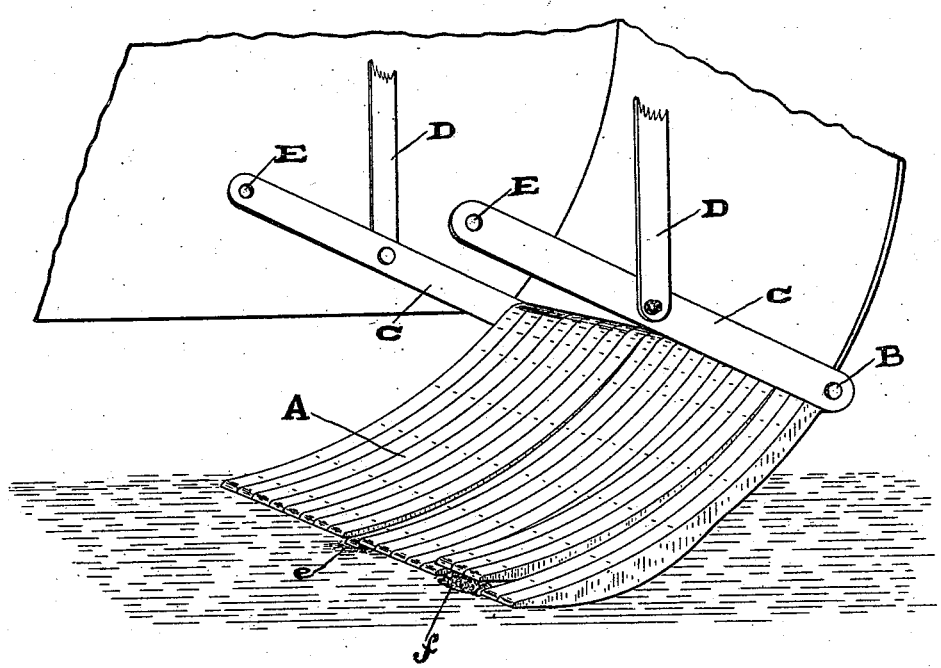
WITNESSES:
C. M. Buettner
M. M. Barnes
INVENTOR,
Thomas C. Myers.
BY
Geo. W. Tibbitts.
ATTORNEY.

UNITED STATES PATENT OFFICE.

THOMAS C. MYERS, OF CLEVELAND, OHIO.

STREET-SWEEPER.

SPECIFICATION forming part of Letters Patent No. 501,353, dated July 11, 1893.

Application filed May 2, 1892. Serial No. 431,594. (No model.)

*To all whom it may concern:*

Be it known that I, THOMAS C. MYERS, a citizen of the United States, and a resident of Cleveland, in the county of Cuyahoga and State of Ohio, have invented certain new and useful Improvements in Power Street-Sweeping Machines, of which the following is a specification.

This invention relates to street sweeping machines, and consists of a drag-apron composed of a number of loosely pivoted bars adapted to independently accommodate themselves to pass over obstructions, depressions, or unevenness of the ground. This drag apron is designed to be attached to the lower edge of the front wall of the casing comprising the housing of the main rotary brush of my power sweeping machine, No. 457,746, for which a patent was granted me on the 11th of August, 1891.

In the accompanying drawing—The figure is a perspective view of my drag-apron showing its adaptability for self adjustment in moving along over the ground.
A represents curved bars pivoted on a rod B, having its ends supported in the lower ends of diagonally disposed levers C C, the upper ends E of which are to be pivoted or journaled to some suitable part of the frame work or housing of the machine.

D D are links or connecting rods pivoted to the middle part of the levers C C, for connecting them with a mechanism for raising and lowering the apron. The under side of the bars A, where they drag on the ground, are made thicker than the pivoted ends, the purpose of which is to provide that when one or more of the bars are raised or depressed, as seen at $f$ or $e$, the space between the bars shall not be opened sufficiently to allow dirt to fall through.

Having described my invention, I claim—

The combination with the brush casing in a street sweeping machine, of the drag apron consisting of a series of curved bars A pivotally attached to a bar at the lower edge of the casing, and adapted to separately raise or lower in passing over obstructions or depressions; levers C C attached to said pivot bar, and also pivotally connected to the brush casing, links D D, attached to said levers, as a means for adjusting said drag apron, substantially as described.

THOMAS C. MYERS.

Witnesses:
 GEO. W. TIBBITTS,
 WM. H. DEWITT.